United States Patent
Gupta et al.

(10) Patent No.: US 11,354,182 B1
(45) Date of Patent: Jun. 7, 2022

(54) INTERNAL WATCHDOG TWO STAGE EXTENSION

(71) Applicant: Cisco Technology, Inc., San Jose, CA (US)

(72) Inventors: Gaurav Gupta, Sunnyvale, CA (US); Sachin Naik, Fremont, CA (US); Stefan Martin Schaeckeler, Santa Clara, CA (US); Surajit Ghoshal, Roseville, CA (US); Titian Lau, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/872,606

(22) Filed: May 12, 2020

Related U.S. Application Data

(60) Provisional application No. 62/946,088, filed on Dec. 10, 2019.

(51) Int. Cl.
*G06F 11/07* (2006.01)
*G06F 11/14* (2006.01)

(52) U.S. Cl.
CPC ...... *G06F 11/0757* (2013.01); *G06F 11/0706* (2013.01); *G06F 11/0772* (2013.01);
(Continued)

(58) Field of Classification Search
CPC ............. G06F 11/0757; G06F 11/0766; G06F 11/0772; G06F 11/0778; G06F 11/0706;
(Continued)

(56) References Cited

U.S. PATENT DOCUMENTS 6,437,531 B1 * 8/2002 Kawamura ........ G05B 19/0428
318/445
6,697,973 B1 * 2/2004 Baumeister, IV .. G06F 11/0721
714/23

(Continued)

FOREIGN PATENT DOCUMENTS

GB 2310514 A * 8/1997 .......... G06F 11/0757

OTHER PUBLICATIONS

R. K. Unni, P. Vijayanand and Y. Dilip, "FPGA Implementation of an Improved Watchdog Timer for Safety-Critical Applications," 2018 31st International Conference on VLSI Design and 2018 17th International Conference on Embedded Systems (VLSID), 2018, pp. 55-60 (Year: 2018).*

(Continued)

*Primary Examiner* — Bryce P Bonzo
*Assistant Examiner* — Albert Li
(74) *Attorney, Agent, or Firm* — Baker Botts, LLP

(57) ABSTRACT

According to some embodiments, a system comprises a computer system comprising a processing unit, an interrupt controller, an internal watchdog, and a computer system reset interface. The system further comprises a watchdog controller comprising a secondary watchdog timer. Expiry of the computer system internal watchdog triggers the interrupt controller to cause the processing unit to collect debug information and triggers the watchdog controller to start a secondary watchdog timer. Expiry of the secondary watchdog timer triggers the watchdog controller to reset the computer system.

20 Claims, 2 Drawing Sheets

(52) U.S. Cl.
CPC ...... *G06F 11/0778* (2013.01); *G06F 11/0787* (2013.01); *G06F 11/1441* (2013.01); *G06F 2201/805* (2013.01)

(58) Field of Classification Search
CPC ............ G06F 11/0787; G06F 11/1441; G06F 2201/805; G06F 2201/81; G06F 2201/88; G06F 15/7814; G06F 1/24; G05B 19/0428; G05B 2219/25158
See application file for complete search history.

(56) References Cited

U.S. PATENT DOCUMENTS

| | | | | |
|---|---|---|---|---|
| 11,144,358 B1* | 10/2021 | Noble | .................... | G06F 11/108 |
| 2004/0003317 A1* | 1/2004 | Kwatra | ............... | G06F 11/0781 |
| | | | | 714/25 |
| 2004/0225831 A1* | 11/2004 | Pail | ....................... | G06F 11/073 |
| | | | | 711/105 |
| 2006/0053349 A1* | 3/2006 | Ozawa | ................. | G06F 11/0757 |
| | | | | 714/55 |
| 2006/0277448 A1* | 12/2006 | Koto | .................... | G06F 11/0757 |
| | | | | 714/E11.003 |
| 2007/0220364 A1* | 9/2007 | Li | ....................... | G06F 11/0778 |
| | | | | 714/45 |
| 2008/0276132 A1* | 11/2008 | Majewski | ........... | G06F 11/0757 |
| | | | | 714/55 |
| 2014/0082434 A1* | 3/2014 | Knight | ................ | G06F 11/0739 |
| | | | | 714/55 |
| 2014/0143595 A1* | 5/2014 | Abdukadir | .......... | G06F 11/1633 |
| | | | | 714/12 |
| 2015/0006978 A1* | 1/2015 | Tokunaga | ........... | G06F 11/0724 |
| | | | | 714/55 |
| 2018/0225143 A1* | 8/2018 | Ma | ....................... | G06F 11/0757 |

OTHER PUBLICATIONS

Lamberson, PJim, "Single and Multistage Watchdog Timers", 2012, Sensoray, Retrieved from Google: <http://www.sensoray.com/downloads/whitepaper_watchdogtimer.pdf> (Year: 2012).*

ARM, "CoreLink™ GIC-400 Generic Interrupt Controller Revision: r0p1", Retrieved from Google: <https://developer.arm.com/documentation/ddi0471/b/> (Year: 2012).*

Wikipedia, "Watchdog timer," https://en.wikipedia.org/wiki/Watchdog_timer, Date Printed: Mar. 9, 2020, 6 pages.

* cited by examiner

INTERNAL WATCHDOG TWO STAGE EXTENSION

RELATED APPLICATIONS

This application claims priority to U.S. Provisional Application Ser. No. 62/946,088 entitled "BMC Internal Watchdog Two Stage Extension," filed Dec. 10, 2019, the entire content of which is incorporated herein by reference.

TECHNICAL FIELD

This disclosure generally relates to a two stage watchdog, and more specifically to hardware chaining of an internal and external watchdog for a computer system, such as a system on a chip (SOC), general purpose central processing unit (CPU), or a baseboard management controller (BMC), to create a two stage watchdog.

BACKGROUND

A watchdog timer is a timer used to detect and recover from computer malfunctions. During normal operation, the computer regularly resets the watchdog timer to prevent it from timing out. If a hardware fault or program error prevents the computer from resetting the watchdog, the timer expires and generates a timeout. The timeout may be used to initiate corrective action.

Watchdog timers are commonly found in embedded systems and other computer-controlled equipment where humans cannot easily access the equipment or are unable to react to faults in a timely manner. In such systems, the computer must be self-reliant.

Multistage watchdogs are used by embedded systems where earlier stages are used to collect debug information, take corrective actions, and start the next stage. The final stage timeout typically restarts the central processing unit (CPU).

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
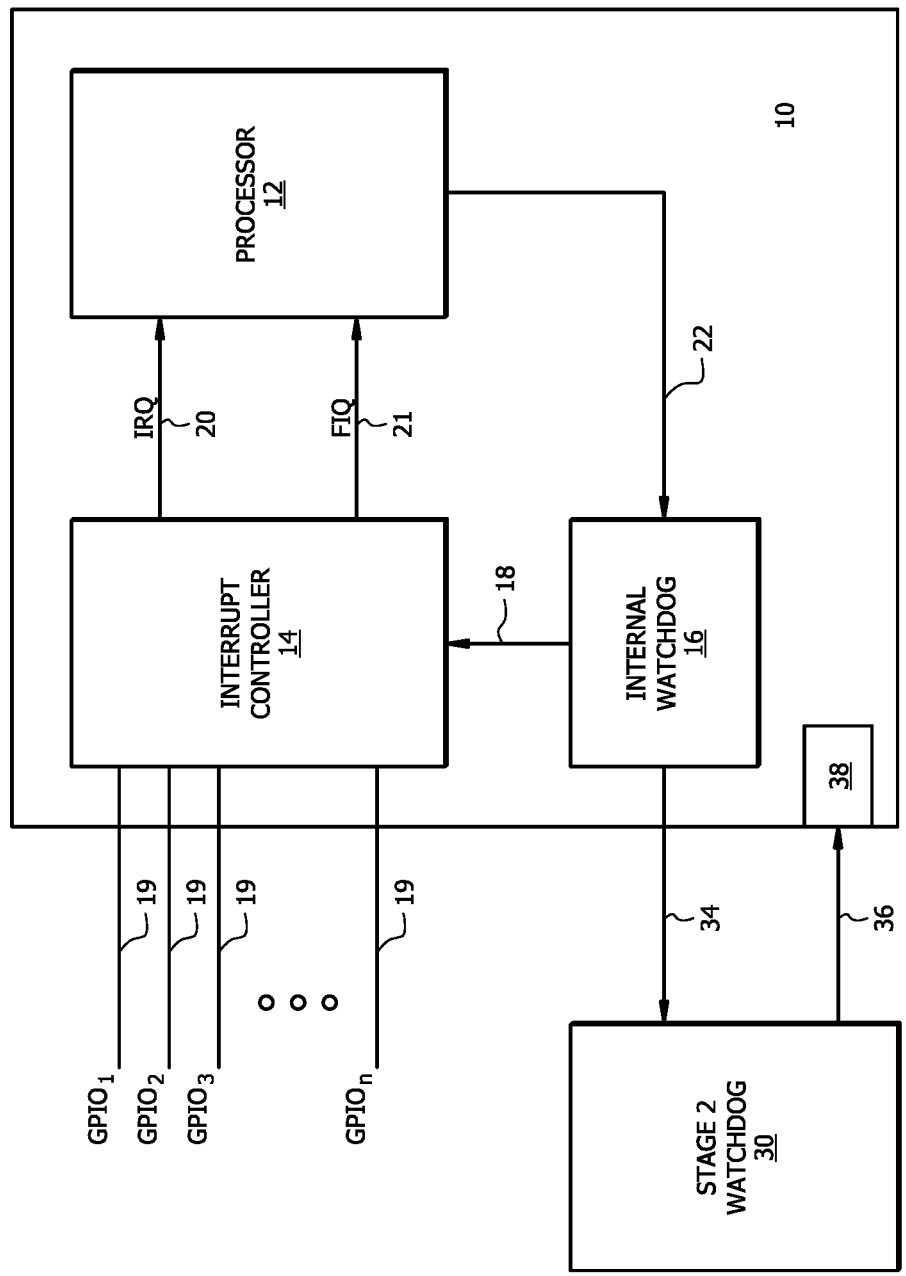
FIG. 1 is block diagram illustrating an example two stage watchdog for a computer system, according to a particular embodiment.

For a carrier grade service provider router, a two or multi stage watchdog is beneficial so that a first stage watchdog expiry can send a fast signal to the central processing unit (CPU) to collect debug information and initiate a graceful reset. The earlier stage timer expiry is delivered to the CPU at high priority so that the CPU can preempt and take necessary action. For an X86 CPU, a high speed interrupt is referred to as a non-maskable interrupt (NMI), and for an ARM CPU, a high speed interrupt is referred to as a fast interrupt (FIQ).

The second stage resets the CPU if the first stage is not able to gracefully recover (e.g., gets stuck). Not all computing systems, however, support two or multi stages of watchdog.

For example, Aspeed baseboard management controller (BMC) chips use an ARM CPU and do not support a two stage watchdog. As a result, OpenBMC (an open source project implementing a BMC firmware stack) also does not support a two stage watchdog.

Aspeed BMC chips are limited in that all general purpose input/output (GPIO) interrupts are either all configurable as interrupts (IRQs) or as fast interrupts (FIQs). This means that all GPIO interrupts get the same priority (i.e., there is no way to prioritize certain interrupts over others). Thus, none of the GPIO interrupts are suitable for use as a watchdog trigger.

Example Embodiments

Particular embodiments obviate one or more of the problems described above and include hardware chaining of an internal and external watchdog for a computer system, such as a system on a chip (SOC), to create a two stage watchdog.

According to some embodiments, a system comprises a computer system comprising a processing unit and an interrupt controller. The interrupt controller comprises one or more general purpose inputs/outputs coupled to the processing unit. Each of the general purpose inputs/outputs is configured as an interrupt. The interrupt controller further comprises an internal fast interrupt coupled to the processing unit. The computer system further comprises an internal watchdog comprising a first output and a second output. The first output is coupled to the internal fast interrupt of the interrupt controller. The computer system further comprises a computer system reset interface. The system further comprises a watchdog controller comprising a signal input coupled to the second output of the computer system internal watchdog and a signal output coupled to the computer system reset interface.

Expiry of the computer system internal watchdog: (a) triggers the internal watchdog first output coupled to the internal fast interrupt of the interrupt controller causing the processing unit to collect debug information; and (b) triggers the internal watchdog second output causing the watchdog controller to start a secondary watchdog timer. Expiry of the secondary watchdog timer triggers the watchdog controller signal output causing the computer system to reset (e.g., in case the debug collection is stuck and did not gracefully reset the system).

According to some embodiments, a watchdog controller comprises a signal input coupled to a computer system internal watchdog output and a signal output coupled to a computer system reset interface. Expiry of the computer system internal watchdog triggers the watchdog controller to start a secondary watchdog timer. Expiry of the secondary watchdog timer triggers the signal output causing the computer system to reset (e.g., in case the debug collection initiated by the internal watchdog is stuck and did not gracefully reset the system).

Some embodiments include a method of collecting debug information on a computer system. The computer system comprises a processing unit and an interrupt controller comprising one or more general purpose inputs/outputs coupled to the processing unit. Each of the general purpose inputs/outputs are configured as an interrupt. The interrupt controller further comprises an internal fast interrupt coupled to the processing unit. The computer system further comprises and an internal watchdog. The method comprises, upon expiry of the computer system internal watchdog, (a) triggering the internal fast interrupt of the interrupt controller causing the processing unit to collect debug information, and (b) triggering a watchdog controller to start a secondary watchdog timer. Upon expiry of the secondary watchdog timer, the method comprises resetting the computer system (e.g., in case the debug collection is stuck and did not gracefully reset the system).

Particular embodiments are described in more detail with respect to the following figures and associated descriptions. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 is block diagram illustrating an example two stage watchdog for a computer system, such as a SOC, baseboard management controller (BMC), general purpose central processing unit (CPU), etc., according to a particular embodiment. Computer system 10 includes processing unit 12, interrupt controller 14, internal watchdog 16, and reset interface 38.

Processing unit 12 may comprise a general purpose CPU, such as an ARM processor or an x86 processor, or any other suitable processor. Interrupt controller 14 couples one or more general purpose inputs/outputs (GPIO) 19 to processing unit 12 over interface 20. In some embodiments, GPIO 19 may be configured as an interrupt or a high priority interrupt. In some embodiments, all of the one or more GPIOs must be configured as the same type. For example, all GPIOs may be configured as interrupts. Interface 20 may comprise an internal bus between processing unit 12 and the other components of computer system 10.

Internal watchdog 16 comprises a single stage watchdog. Internal watchdog 16 comprises a first output coupled to an internal interface of interrupt controller 14 over interface 18. The internal interface may be configured as a high priority interrupt (e.g., FIQ, NMI, etc.). The high priority interrupt is coupled to processing unit 12 via interface 21. Interfaces 18 and 21 may comprise an internal bus between processing unit 12 and the other components of computer system 10.

Processing unit 12 periodically resets internal watchdog 16 over interface 22. Interface 22 may comprise an internal bus between processing unit 12 and the other components of computer system 10.

Although illustrated as point to point interfaces for simplicity, in some embodiments interfaces 18, 20, 21, and 22 may all comprise the same internal bus.

Internal watchdog 16 also comprises a second output coupled to watchdog controller 30 via interface 34. Interface 34, for example, may be connected to a GPIO of watchdog controller 30.

Watchdog controller 30 comprises a signal input (e.g., GPIO on interface 34), a secondary watchdog timer, and signal output 36. Signal output 36 is coupled to reset interface 38 of computer system 10.

In particular embodiments, computer system 10 (e.g., an Aspeed BMC) internal watchdog 16 is configured as a stage one timer and its first output is coupled to a high speed interrupt (e.g., FIQ). As long as processing unit 12 is functioning properly, processing unit 12 resets internal watchdog 16 before the watchdog timer expires. If processing unit 12 is not able to reset internal watchdog 16, for example because of processing problems, then internal watchdog 16 timer expires and triggers the high priority interrupt to processing unit 12. The high priority interrupt handler is called which may be used to collect debug information from the system (e.g., kernel core). The high priority interrupt handler runs in a high priority context and is able to get debug information even if the system is in a bad state. If the debug collection is successful, then the high priority interrupt handler may gracefully reset the system, e.g. reboot the processing unit and/or computer system.

In parallel, the internal watchdog 16 timeout sends a trigger to watchdog controller 30 (e.g., a field programmable gate array (FPGA)) to start a stage two watchdog timer (e.g., secondary watchdog timer). The purpose of the secondary watchdog is that the debug collection procedure in processing unit 12 also has the possibility of getting stuck. If the debug collection process does not finish gracefully, then the secondary watchdog timer expires and watchdog controller 30 resets computer system 10 using reset interface 38 (e.g., reset pin).

If computer system 10 is reset gracefully by the first stage interrupt handler, then computer system 10 may disable the secondary watchdog (either before resetting or upon restart of computer system 10) so that the secondary watchdog does not accidentally reset computer system 10.

Aspeed is one of the biggest vendors for BMC chips. The chips are used, among other, in service provider, data center and enterprise switches and routers as well as in servers and so forth. Such routers and switches need to be highly available but should not sacrifice debuggability. One cornerstone of high availability is watchdogs that detect a hung system, collect debug information and reset (reboot) the system. Particular embodiments provide advantages in error handling and recovery. Because not all computer systems support a two stage watchdog, particular embodiments may adapt to any suitable computer system, whether the computer system is SOC and ARM based or otherwise.

Figure 2:
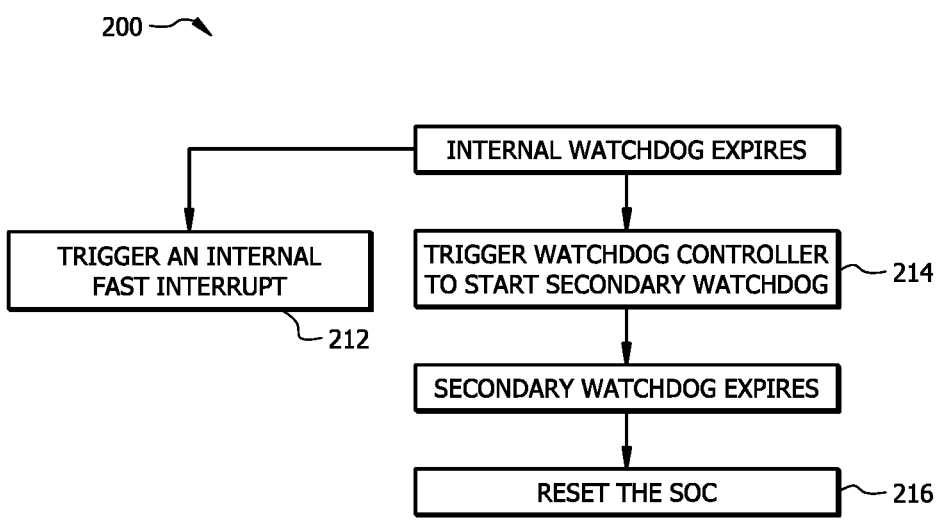
FIG. 2 is a flow diagram illustrating a method in an example watchdog controller, according to a particular embodiment.

FIG. 2 is a flow diagram illustrating a method in an example watchdog controller, according to a particular embodiment. The steps of method 200 in FIG. 2 may be performed by watchdog controller 30 and computer system 10 illustrated in FIG. 1.

The method begins with the expiry of a computer system internal watchdog (e.g., internal watchdog 16). At step 212, an internal interface of an interrupt controller is triggered, causing a high priority interrupt at a processing unit, which causes the processing unit to collect debug information. For example, internal watchdog 16 may be coupled to an internal interface of interrupt controller 14 via interface 18. Expiry of internal watchdog 16 triggers a high priority interrupt, which may cause processing unit 12 to collect debug information.

If the debug collection is successful, then the high priority interrupt handler may gracefully reset the system, e.g. reboot the processing unit and/or computer system. However, there is a possibility that the debug collection may get stuck and the processing unit may not be able to reset the system. Thus, the method includes step 214.

At step 214, a watchdog controller (e.g., watchdog controller 30) is triggered to start a secondary watchdog timer. For example, expiry of internal watchdog 16 triggers, via interface 34 (e.g., connected to a GPIO of secondary watchdog controller 30), secondary watchdog controller 30 to start a secondary watchdog timer.

At step 216, upon expiry of the second watchdog timer, the computer system is reset. For example, signal output 36 of watchdog controller 30 may be coupled to reset interface

38 of computer system 10. Expiration of secondary watchdog 32 may trigger a reset of computer system 10 over signal output 36.

Modifications, additions, or omissions may be made to method 200 depicted in FIG. 2. Method 200 may include more, fewer, or other steps. Additionally, steps may be performed in parallel or in any suitable order.

A computer system may be used by the systems and methods described herein. For example, one or more components of FIGS. 1 and 2 may include one or more interface(s), processing circuitry, memory(ies), and/or other suitable element(s). The interface receives input, sends output, processes the input and/or output, and/or performs other suitable operation. The interface may comprise hardware and/or software.

The processing circuitry performs or manages the operations of the component. The processing circuitry may include hardware and/or software. Examples of a processing circuitry include one or more computers, one or more microprocessors, one or more applications, etc. In certain embodiments, the processing circuitry executes logic (e.g., instructions) to perform actions (e.g., operations), such as generating output from input. The logic executed by the processing circuitry may be encoded in one or more tangible, non-transitory computer readable media. For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

The memory (or memory unit) stores information. The memory may comprise one or more non-transitory, tangible, computer-readable, and/or computer-executable storage media. Examples of the memory include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A system comprising:
    a computer system comprising:
        a processing unit;
        an interrupt controller comprising one or more general purpose inputs/outputs coupled to the processing unit, each of the general purpose inputs/outputs configured as an interrupt, and an internal fast interrupt coupled to the processing unit;
        an internal watchdog comprising a first output and a second output, wherein the first output is coupled to the internal fast interrupt of the interrupt controller;
        a computer system reset interface;
    a watchdog controller external to the computer system, the watchdog controller comprising:
        a signal input coupled to the second output of the computer system internal watchdog;
        a signal output coupled to the computer system reset interface;
    wherein expiry of the computer system internal watchdog:
        triggers the internal watchdog first output coupled to the internal fast interrupt of the interrupt controller causing the processing unit to collect debug information;
        triggers the internal watchdog second output causing the watchdog controller to start a secondary watchdog timer; and
    wherein expiry of the secondary watchdog timer triggers the watchdog controller signal output causing the computer system to reset.

2. The system of claim 1, wherein the computer system comprises a baseboard management controller (BMC).

3. The system of claim 1, wherein the computer system comprises a system on a chip (SOC).

4. The system of claim 1, wherein the processing unit comprises an ARM central processing unit.

5. The system of claim 1, wherein the processing unit comprises an x86 central processing unit.

6. The system of claim 1, wherein the watchdog controller comprises a field programmable gate array (FPGA).

7. A watchdog controller external to a computer system, the watchdog controller comprising:
    a signal input coupled to an internal watchdog output of the computer system;
    a signal output coupled to a reset interface of the computer system;
    wherein:
        expiry of the computer system internal watchdog triggers the watchdog controller to start a secondary watchdog timer; and
    expiry of the secondary watchdog timer triggers the signal output causing the computer system to reset.

8. The watchdog controller of claim 7, wherein the computer system comprises a baseboard management controller (BMC).

9. The watchdog controller of claim 7, wherein the computer system comprises a system on a chip (SOC).

10. The watchdog controller of claim 7, wherein the computer system comprises an ARM central processing unit.

11. The watchdog controller of claim 7, wherein the computer system comprises an x86 central processing unit.

12. The watchdog controller of claim 7, wherein the watchdog controller comprises a field programmable gate array (FPGA).

13. A method of collecting debug information on a computer system, the computer system comprising a processing unit, an interrupt controller comprising one or more general purpose inputs/outputs coupled to the processing unit, each of the general purpose inputs/outputs configured as an interrupt, the interrupt controller further comprising an internal fast interrupt coupled to the processing unit, and an internal watchdog, the method comprising:
  upon expiry of the computer system internal watchdog:
    triggering the internal fast interrupt of the interrupt controller causing the processing unit to collect debug information;
    triggering a watchdog controller external to the computer system to start a secondary watchdog timer; and
  upon expiry of the secondary watchdog timer, resetting the computer system.

14. The method of claim 13, wherein the internal watchdog comprises a first output and a second output, the first output is coupled to the internal fast interrupt of the interrupt controller and the second output is coupled to the watchdog controller.

15. The method of claim 13, wherein the watchdog controller is coupled to a reset interface of the computer system.

16. The method of claim 13, wherein the processing unit collects debug information within a high priority interrupt handler.

17. The method of claim 13, wherein the computer system comprises a baseboard management controller (BMC).

18. The method of claim 13, wherein the computer system comprises a system on a chip (SOC).

19. The method of claim 13, wherein the computer system comprises an ARM CPU.

20. The method of claim 13, wherein the watchdog controller comprises a field programmable gate array (FPGA).

* * * * *